Nov. 26, 1968   C. L. E. MARCHERON   3,412,831
SECTOR TYPE BRAKE DISC
Filed April 28, 1967   5 Sheets-Sheet 1
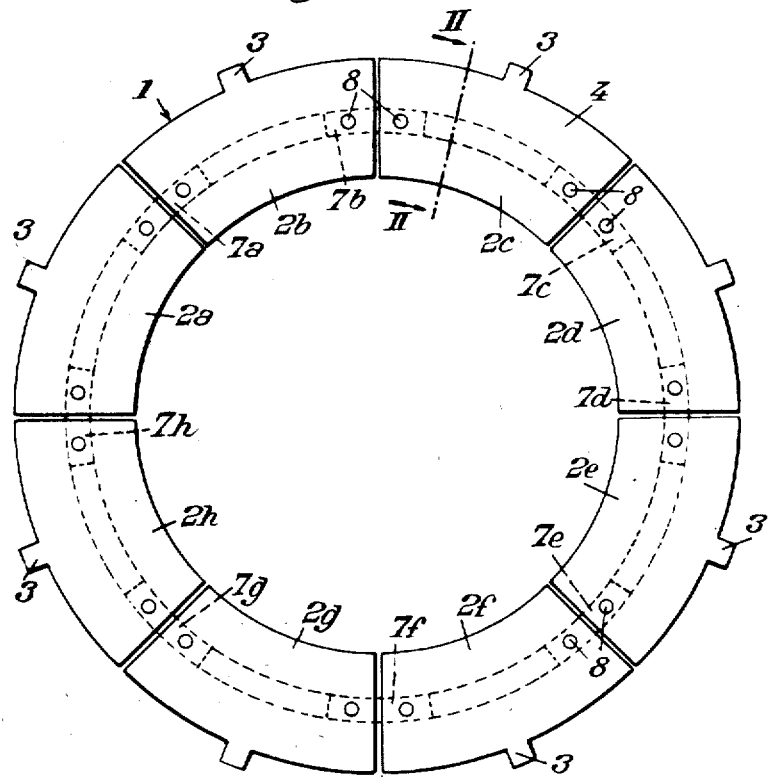
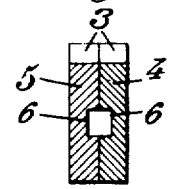
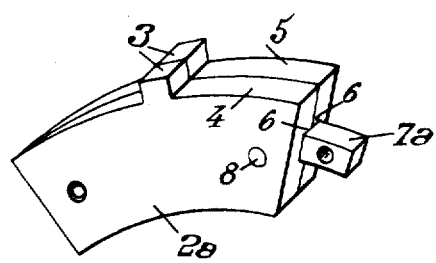

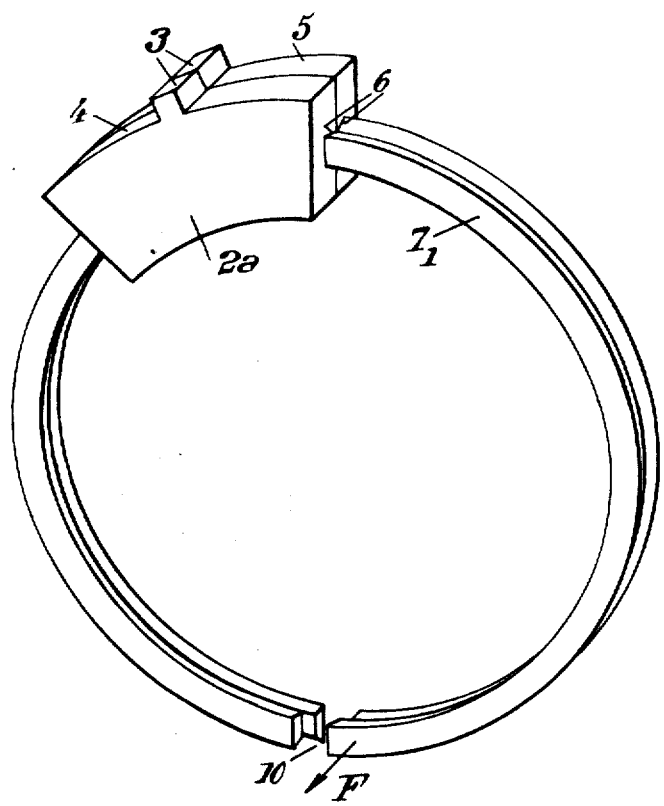

United States Patent Office 3,412,831
Patented Nov. 26, 1968

3,412,831
SECTOR TYPE BRAKE DISC
Claude Louis Edouard Marcheron, Montrouge, France, assignor to Societe Hispano-Suiza-Lallemant, Bois-Colombes, France
Filed Apr. 28, 1967, Ser. No. 634,663
Claims priority, application France, June 17, 1966, 65,954
11 Claims. (Cl. 188—218)

ABSTRACT OF THE DISCLOSURE

Improved friction disc brake wherein at least one of the annular friction discs is formed by a plurality of sectors arranged circumferentially about the disc axis, the sectors being interconnected by a mechanism which allows circumferential movement of the sectors relative to each other. The mechanism includes a groove formed in each sector and extending circumferentially about the disc axis and either a continuous or a plurality of discontinuous annular elements passing through the grooves for interconnecting the sectors to allow the circumferential relative movement of the sectors.

BACKGROUND—FIELD OF THE INVENTION

This invention relates to disc brakes of the kind which comprise at least one friction disc, that is, at least one disc, either rotating or non-rotating, fitted or not with linings on one or the other of its two faces and designed to frictionally cooperate with at least one other element with which one of its faces is brought into contact and relatively to which it possesses a rotation speed, and the invention relates particularly, although not exclusively, to aircraft landing-gear disc brakes.

BACKGROUND—DESCRIPTION OF THE PRIOR ART

In the operation of disc brakes, the frictional discs are subjected to overall heating which causes the temperature of the disc to increase. However, this temperature rise will vary at different parts of the disc. In disc brakes of the type known heretofore, upon protracted braking action these large and non-uniform temperature changes created internal stresses in the disc, thus causing distortion of the disc—for example, by warping, coning, or the like—thus seriously impairing the efficacy of the braking action.

Consequently, these exists a need for an improved disc brake which will operate efficiently notwithstanding large and non-uniform temperature changes in the frictional discs.

SUMMARY OF THE INVENTION

A purpose of the present invention is to provide a disc brake which overcomes the disadvantages of the prior art by providing an improved friction disc formed as a plurality of separate sectors interconnected by an assembly means permitting a degree of circumferential play between the sectors.

Accordingly, each sector comprises two substantially identical portions joined together symmetrically in relation to the disc symmetry plane perpendicular to the disc axis, at least one groove formed in each of the mutually facing surfaces of said portions and curved circularly to extend circumferentially about the disc axis at a distance from the disc approximately equal to the mean disc radius, the two grooves associated respectively to said portions being curved about the same axis and at least partly overlapping.

Said assembly means comprises at least one discontinuous or continuous annular element coaxial with the disc and the cross-section of which in a plane taken through the disc axis substantially matches the cross-section of the channel bounded by the two circular grooves when the two constituent portions of each sector are joined together side by side, said annular element being such as to enable the sectors to undergo, by sliding along said annular element, circular shifts relatively to one another of magnitude dependent upon the circumferential play to be possessed by the disc.

BRIEF DESCRIPTION OF THE DRAWINGS

In the drawings:
FIGURE 1 is a diagrammatic side elevation view of a friction disc for a disc brake, devised according to a first form of embodiment of the invention.
FIGURE 2 is a section through the line II—II of FIGURE 1.
FIGURE 3 is a fragmental perspective view of the disc of FIGURE 1.
FIGURE 7 is a partial perspective view of a friction disc for landing-gear disc brakes, as devised according to yet another form of embodiment of the invention.

DESCRIPTION OF THE PREFERRED EMBODIMENTS

The subject disc brake of this invention may be devised in any convenient manner provided only that it comprises at least one disc participating in the rotation of the wheel to be braked (that is, a rotating friction disc), adapted to frictionally cooperate, subsequent to a relative axial shift, with at least one angularly motionless disc (that is, with a non-rotating friction disc), one or both of these discs being possibly provided with friction linings on its or their working face or faces.

The principal feature of the invention, to which reference will be made hereinafter, can be embodied in any friction disc used in a disc brake, that is, in a rotating or non-rotating disc provided or not with one or more linings.

Said principal feature will first be considered in its application to a rotating friction disc devoid of friction linings and adapted to have its two sides cooperating with friction linings carried on two non-rotating discs located on either side of said friction disc and capable of being moved toward the same (see FIGURES 1–7).

Figure 8:
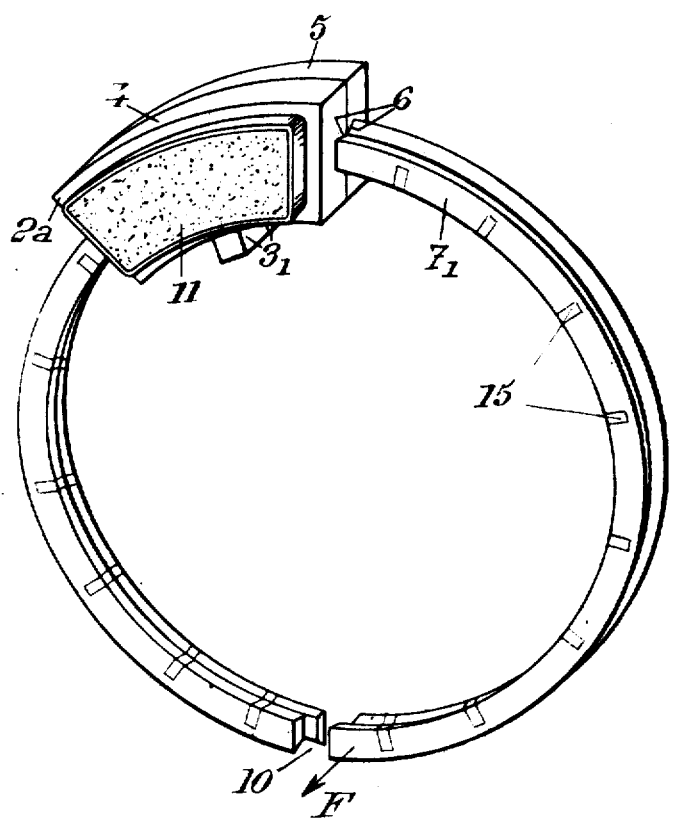
FIGURE 8 is a view corresponding to FIGURE 7 of an alternative embodiment.

Application of said principal feature will then be considered in the case of a non-rotating friction disc provided with linings and adapted to have its two sides cooperating with two rotating discs positioned on either side of said friction disc and capable of being moved toward the same (see FIGURE 8).

Figure 4:
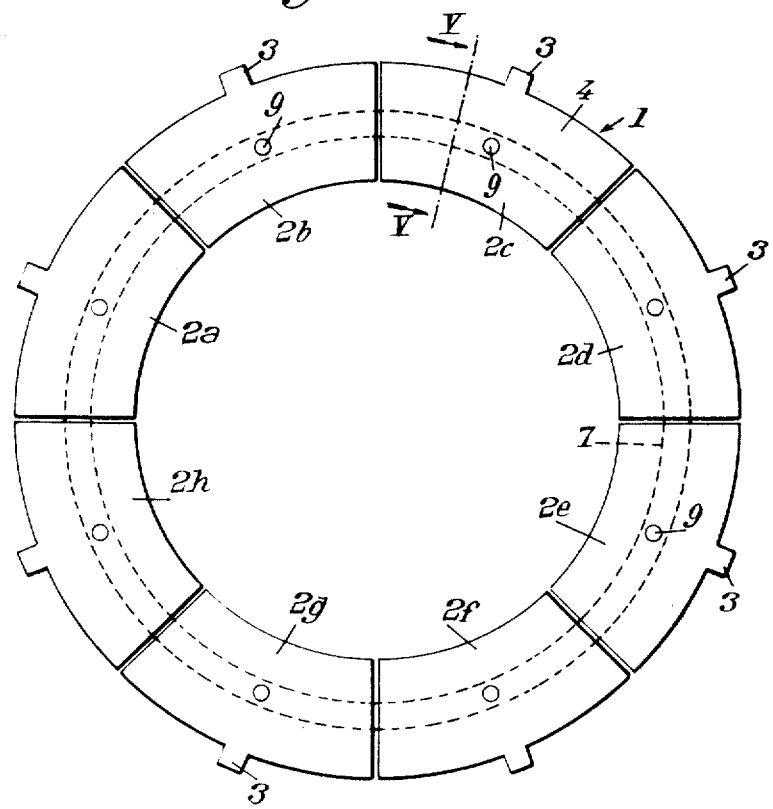
FIGURE 4 is a diagrammatic side elevation view of a friction disc for a landing-gear disc brake, as devised according to another form of embodiment of the invention.

As shown in FIGURES 1 and 4, the present invention comprises a friction disc 1 having a plurality of separate sectors 2a, 2b, 2c, 2d, etc., interconnected by assembly means permitting a degree of circumferential movement of the constituent disc sectors relatively to one another.

In a preferred embodiment, the disc 1 is made up of eight sectors 2a, 2b, 2c, 2d, etc. Each of these sectors may be set angularly into a rotating part of the landing gear, for instance a wheel (see FIGURE 9) in the case of a rotating friction disc, and each disc sector is formed on its outer edge with a tenon 3 adapted to cooperate with a groove formed in the rim of said wheel (see FIGURES 1–7).

Alternatively, each sector may be set into a non-rotating part of the landing gear, such as a central tube (see FIGURE 9) in the case of a non-rotating friction disc, in which case the inner edge of each such disc sector is formed with a tenon $3_1$ adapted to cooperate with a groove formed in said central tube (see FIGURE 8).

Each sector is made up of two identical portions 4 and 5 joined together symmetrically in relation to the symmetry plane of the disc perpendicular to the axis thereof, at least one circular and substantially tubular groove 6 of radius approximately equal to the mean disc radius being formed in each of the facing surfaces of the two portions 4 and 5 and the two curved (that is, circumferentially extending) grooves 6 respectively associated to said portions 4 and 5 being coaxial and overlapping at least partly.

Said assembly means comprises at least one discontinuous or continuous annular element coaxial with the disc, the cross-section of which in a plane taken through the disc axis matches the cross-section of the channel bounded by the two curved grooves 6 when the two constituent portions 4 and 5 of each sector are joined together, said annular element being such that the sectors can be sliding along said annular element shift circularly to an extent dependent on the circumferential clearance provided between adjacent pairs of disc sectors.

Reference is first had to FIGURES 1, 2 and 3 for a form of embodiment of a rotating friction disc devoid of linings, in accordance with which a single curved groove 6 is formed in each of the mutually facing surfaces of the two constituent sector portions 4 and 5, the radius of curvature of said curved groove 6 being substantially equal to the main disc radius. In this constructional form the assembly means comprises a discontinuous annular element, there being as many separate elements as there are disc sectors. In the example shown, the annular element is made up of eight separate elements 7a, 7b, 7c . . ., each of which interconnects two adjacent disc sectors.

Preferably, the curved groove 6 is of rectangular cross-section whereby, when the two constituent portions 4 and 5 of each sector are joined together, the cross-section bounded by the two curved grooves 6 is rectangular or possibly square and the separate elements 7a, 7b, 7c . . . will accordingly have a rectangular or possibly square cross-section.

In this particular instance it will be advantageous to provide at least one securing member between each separate element and the associated sector, the assembly comprising said separate element, said sector and said securing member being so devised as to permit two adjacent sectors to undergo the circular (that is circumferential) displacement relative to each other that gives the disc its circumferential play. Accordingly, each sector comprises two securing members extending parallel to the disc axis, respectively disposed proximate the two radial edges of the sector and consisting respectively of a countersunk hollow rivet 8.

Figure 6:
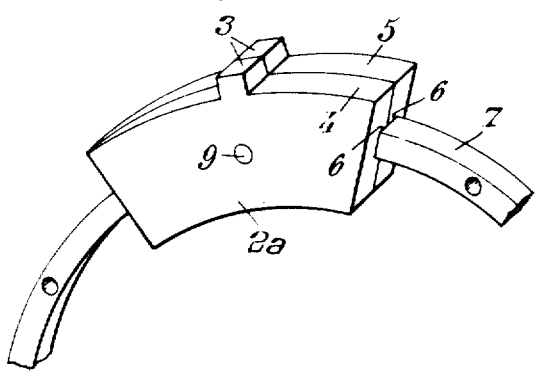
FIGURE 6 is a fragmental perspective view of the disc of FIGURE 4.
Figure 5:
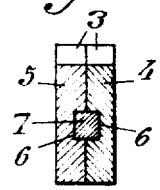
FIGURE 5 is a section through the line V—V of FIGURE 4.

Reference is next had to FIGURES 4, 5 and 6 for an alternative embodiment of a rotating disc devoid of linings, in accordance with which a single curved groove 6 is formed in each of the facing surfaces of the two constituent sector portions 4 and 5 and has a radius of curvature substantially equal to the mean disc radius, said assembly means comprising, in this instance, a continuous annular element 7.

In this specific constructional form, curved groove 6 preferably has a rectangular cross-section, whereby when the two constituent portions 4 and 5 of any sector are joined together the cross-section bounded by the two grooves 6 is rectangular or possibly square and the cross-section of annular element 7 is therefore likewise rectangular or square. At least one securing member is provided between continuous annular element 7 and each sector, the assembly comprising said annular element, said sector and said securing member being devised so that any two adjacent sectors shall be able to shift circularly relatively to each other and thereby enable the disc to absorb circumferential expansion.

In this constructional form, each sector has associated thereto a securing member extending parallel to the disc axis, disposed proximate the middle of the sector and including a countersunk hollow rivet 9.

In the two forms of embodiment described respectively with reference to FIGURES 1, 2 and 3 and FIGURES 4, 5 and 6, it was assumed that curved groove 6 had a rectangular cross-section.

While such a shape will manifestly permit assembly and disassembly of the sectors in an axial direction, it is important to provide securing members adapted, first, to rigidly unite the constituent portions of a sector and, second, to rigidly unite the sectors through the medium of the discontinuous or continuous annular element referred to precedingly.

Reference will now be had to FIGURE 7 for a further constructional form of a rotating disc devoid of linings, in accordance with which the cross-section of curved groove 6 is shaped as a trapezium the smaller base of which constitutes the open side, it being assumed that only one groove 6 is formed on each of the mutually facing surfaces of the two constituent sector portions 4 and 5 and that it has a radius equal to the mean disc radius, whereby when said portions 4 and 5 are joined together the cross-section bounded by the two grooves 6 will be formed of two equal trapeziums having a common smaller base.

It will accordingly be indispensable for said assembly means, such as annual element $7_1$, to have at least one break 10 therein (one being assumed by way of example in the drawings) to permit insertion of the constitutent portions 4 and 5 of each sector, this being accomplished in the embodiment of FIGURE 7 by pulling one end of annular element $7_1$ at the break 10 in the direction of arrow F.

As shown in FIGURE 7, the facing ends of annular element $7_1$, produced by the break 10, are preferably shaped for mutual engagement and possible retention by removable clamping means subsequent to assembly of all the sectors, such clamping means being possibly provided by one of the sectors themselves, which sector would then retain the facing ends of annual element $7_1$ captive in its middle.

It should be noted in connection with the forms of embodiment utilizing a continuous annual element 7 or one having only one break 7₁ therein (respectively FIGURES 4–8), that it is preferable to form said annular element with a plurality of radial slots therein to enable it to absorb distortions in its own plane more readily. Examples of such slots are shown in phantom lines at 15 in FIGURE 8.

Reference is lastly had to FIGURE 8 for an embodiment in which like parts to those in FIGURE 7 are designated by like reference numerals and which shows a non-rotating friction disc lined with trapezoidal friction pads 11.

It will be manifest from the foregoing that a disc brake devised in accordance with any of the forms of embodiment hereinbefore described will be capable of undergoing the functional temperature rises inherent in braking without danger of distortion. Furthermore, discs devised according to any of the preceding embodiments are very simple to machine, since most of the machining operations can be done on a lathe and the separate disc sectors or elements then cut to the required size.

Figure 9:
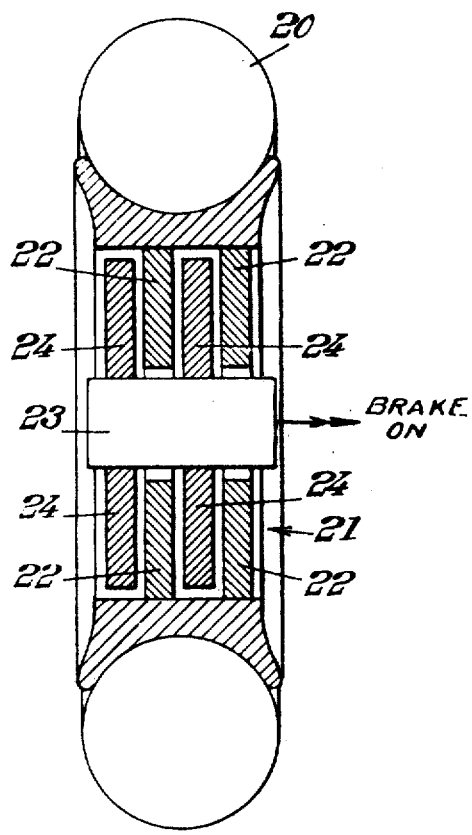
FIGURE 9 illustrates schematically, a wheel and disc brake arrangement of the type in which the friction disc of the present invention may be employed.

FIGURE 9 shows, schematically, a wheel 20 having a disc brake arrangement 21 including two rotating discs 22 attached to the wheel 20, which discs, upon axial movement of the shaft 23 (to the right as shown in FIGURE 9), are frictionally engaged by non-rotating discs 24 for braking the wheel 20.

It is to be understood that either of the rotaitng discs 22 or the stationary discs 24 can employ the features shown in FIGURES 1–8 of the present application. It is only necessary to properly place the tenons 3 for correctly attaching the sectors to their respective support structure in the manner described earlier in this application.

I claim:

1. In a friction-disc brake comprising at least one annular friction disc comprising a plurality of separate sectors arranged circumferentially about the disc axis, the sectors being interconnected by assembly means permitting a degree of circumferential play therebetween, the improvement wherein:

each sector comprises two substantially identical parts joined together symmetrically in relation to the disc symmetry plane perpendicular to the disc axis, at least one curved groove having a radius of curvature approximately equal to the mean disc radius formed in each of the mutually facing surfaces of said two parts, and the two said grooves respectively associated to two parts each being curved about the same axis and at least partly overlapping, the two grooves forming a substantially tubular curved channel when two said parts are joined toegther, and said assembly means comprising at least one circumferentially curved element arranged coaxially with said disc having a cross-section substantially matching the cross-section of the said channel taken in a plane passing through the disc axis, said circumferentially curved elements being located in and extending between the channels of at least two adjacent sectors, each of said two adjacent sectors being positively secured to said element, wherein at least a portion of said adjacent sectors can slide circumferentially along said element about the disc axis so that the sectors can shift circumferentially about the disc axis relative to one another to an extent dependent upon the circumferential deformation which said disc is required to absorb.

2. A brake according to claim 1 wherein each of the mutually facing surfaces of the two constitutent parts of a sector include only a single curved groove, and said assembly means includes a discontinuous circumferentially curved element wherein the entire disc includes as many separate elements as there are sectors.

3. A brake according to claim 2 wherein the said curved groove is of substantially rectangular cross-section, whereby when the two constitutent parts of each sector are joined together, the cross-section of the channel bounded by the two curved grooves is also substantially rectangular and said separate circumferentially curved elements have a substantially rectangular cross-section to fit within the channel.

4. A brake according to claim 3 including at least one securing member connecting each separate circumferentially curved element and the associated sector; wherein the assembly comprising said separate circumferentially curved element, said sector and said securing member is arranged so that any two adjacent sectors may shift circumferentially in relation to each other to enable such discs to absorb circumferential expansion.

5. A brake according to claim 1 wherein a single curved groove is formed in each of the mutually facing surfaces of the two constitutent parts of a sector forming a continuous substantially tubular groove through the sectors and said assembly means comprises a continuous annular element to which each of said sectors are secured.

6. A brake according to claim 5 including a plurality of radial slots in said annular element thereby enabling the said element to more readily absorb distortions in its own plane.

7. A brake according to claim 5 wherein said curved groove is of substantially rectangular cross-section, whereby when the two constitutent parts of each sector are joined together the cross-section of the channel bounded by the two curved grooves is also substantially rectangular and said continuous annular element accordingly has a substantially rectangular cross-section to fit within the channel.

8. A brake according to claim 7 including at least one securing member connecting said continuous annular element and each sector; wherein the assembly comprises said continuous annular element, said sector and said securing member is arranged so that two adjacent sectors may shift circumferentially relative to each other whereby to enable said disc to absorb circumferential expansion thereof.

9. In a friction-disc brake comprising at least one annular friction disc comprising a plurality of separate sectors arranged circumferentially about the disc axis, the sectors being interconnected by assembly means permitting a degree of circumferential play therebetween, the improvment wherein:

each sector comprises two substantially identical parts joined together symmetrically in relation to the disc symmetry plane perpendicular to the disc axis, at least one curved groove having a radius of curvature approximately equal to the mean disc radius formed in each of the mutually facing surfaces of said two parts, and the two said grooves respectively associated to said two parts each being curved about the same axis and at least partly overlapping, whereby the two grooves form a curved channel when two said parts are joined together, and said assembly means comprising at least one circumferentially curved element arranged coaxially with said disc having a cross-section substantially matching the cross-section of the said channel taken in a plane passing through the disc axis, said circumferentially curved elements being so arranged in said channels that the sectors can, by sliding along the element, shift circumferentially relative to one another to an extent dependent upon the circumferential deformation which said disc is required to absorb, said curved groove having a cross-section shaped as a trapezium with a smaller base forming the open side thereof, whereby when the two constitutent parts of each sector are joined together the cross-section of the channel bounded by the curved grooves forms two equal trapeziums having a common smaller base and said circumferentially curved element accordingly has a cross-section substantially identical to the channel and includes at least one break therein to permit insertion of the constitutent parts of the sector onto the said curved element.

10. A brake according to claim 9 wherein the facing ends of said annular element that bound said brake include means for enabling the said facing ends to be joined together.

11. A brake according to claim 9 including a plurality of radial slots in said annular element thereby enabling the said element to more readily absorb distortion in its own plane.

References Cited

UNITED STATES PATENTS

| 2,423,882 | 7/1947 | Frank. |
| 2,531,696 | 11/1950 | Martin. |
| 2,933,162 | 4/1960 | Trevaskis et al. |
| 3,237,731 | 3/1966 | Du Bois. |

FOREIGN PATENTS

| 859,405 | 6/1940 | France. |

MILTON BUCHLER, *Primary Examiner.*

GEORGE E. A. HALVOSA, *Assistant Examiner.*